(12) United States Patent
Koch

(10) Patent No.: US 7,746,674 B2
(45) Date of Patent: Jun. 29, 2010

(54) SELF-OSCILLATING POWER CONVERTER

(75) Inventor: René Frederik Koch, Taipei (TW)

(73) Assignee: Leader Electronics Inc., Taipei Hsien (TW)

( * ) Notice: Subject to any disclaimer, the term of this patent is extended or adjusted under 35 U.S.C. 154(b) by 524 days.

(21) Appl. No.: 11/882,021

(22) Filed: Jul. 30, 2007

(65) Prior Publication Data

US 2008/0205091 A1 Aug. 28, 2008

Related U.S. Application Data

(60) Provisional application No. 60/902,518, filed on Feb. 22, 2007.

(51) Int. Cl.
*H02M 3/335* (2006.01)
(52) U.S. Cl. ......................................... 363/22; 363/24
(58) Field of Classification Search .................. 363/16, 363/18, 22, 23, 24, 25, 31, 133, 139
See application file for complete search history.

(56) References Cited

U.S. PATENT DOCUMENTS

| | | | | |
|---|---|---|---|---|
| 3,828,207 A | * | 8/1974 | Shaw | 330/156 |
| 4,301,498 A | | 11/1981 | Farrer | |
| 5,177,675 A | * | 1/1993 | Archer | 363/25 |
| 5,822,201 A | * | 10/1998 | Kijima | 363/25 |
| 5,852,555 A | * | 12/1998 | Martin | 363/71 |

* cited by examiner

*Primary Examiner*—Bao Q Vu
*Assistant Examiner*—Nguyen Tran
(74) *Attorney, Agent, or Firm*—Muncy, Geissler, Olds, & Lowe, PLLC

(57) ABSTRACT

A push-pull type self-oscillating power converter uses a main power transformer connected to a current transformer in series in such a way that a secondary current flowing through secondary sides of the two transformers is feedback to the primary side of the current drive transformer to generate a drive current for driving two switches. The drive current is proportional to the secondary current in the secondary side of the main power transformer.

8 Claims, 4 Drawing Sheets

SELF-OSCILLATING POWER CONVERTER

CROSS-REFERENCE TO RELATED APPLICATIONS

This application claims benefit of the provision application Ser. No. 60/902,518 entitled "Simple, high efficient, Self-oscillating power converter DC transformer", filed Feb. 22, 2007,

BACKGROUND OF THE INVENTION

1. Field of the Invention

The present invention relates to a DC to DC power converter, and more particularly, to a simple inexpensive power converter providing high efficient power conversion and low no-load power consumption.

2. Description of the Prior Arts

Increasing demands on green requirements, like stand-by power consumption and high efficiency, have left the power electronics industry with the challenge to improve these characteristics, resulting in overall bigger and more expensive power converters. Most power supply designers seek their solution in highly complex resonant type converters with often problematic mass production issues to control the relevant parasitic.

SUMMARY OF THE INVENTION

The objective of the present invention is to provide a push-pull type power converter that is self-driven by an output current of the converter. The power converter comprises of a main power transformer with a primary side and a secondary side respectively connected in series to a primary side and a secondary side of a current transformer. The primary side of the main power transformer includes two primary windings that are connected in series with two primary windings of the current transformer through two switching transistors.

The invention enables automatic dead-time control to ensure that the two branches either at the primary side or the secondary side of the push-pull converter can never be conducting at the same time.

Using the output current of the power converter as a reference for a drive current for the switching transistors reduces the losses in the drive circuitry to a minimum, which results in high efficient characteristics, especially at low load conditions. Another benefit of using the output current as reference for the drive current is that the power converter will automatically stop switching when no or low output currents are drawn, resulting in a hiccup behavior that further enhances the no-load power consumption.

In normal loaded conditions, the power converter will switch continuously with a switching frequency set by the time it takes for the main power transformer to saturate. Saturation of any one of the applied transformers will result in a turn-off of the switch transistors without stress. Furthermore, the use of bi-polar switching elements (BJP transistors) increases the susceptibility of the whole converter towards surges, ESD and foreign field introductions.

Other objectives, advantages and novel features of the invention will become more apparent from the following detailed description when taken in conjunction with the accompanying drawings.

DETAILED DESCRIPTION OF THE PREFERRED EMBODIMENTS

The present invention relates to a simple low-cost power converter that converts a set input voltage (Vin) to a direct proportional, isolated output voltage (Vout) while achieving a high efficient energy transfer with a very low power consumption need.

Figure 1:
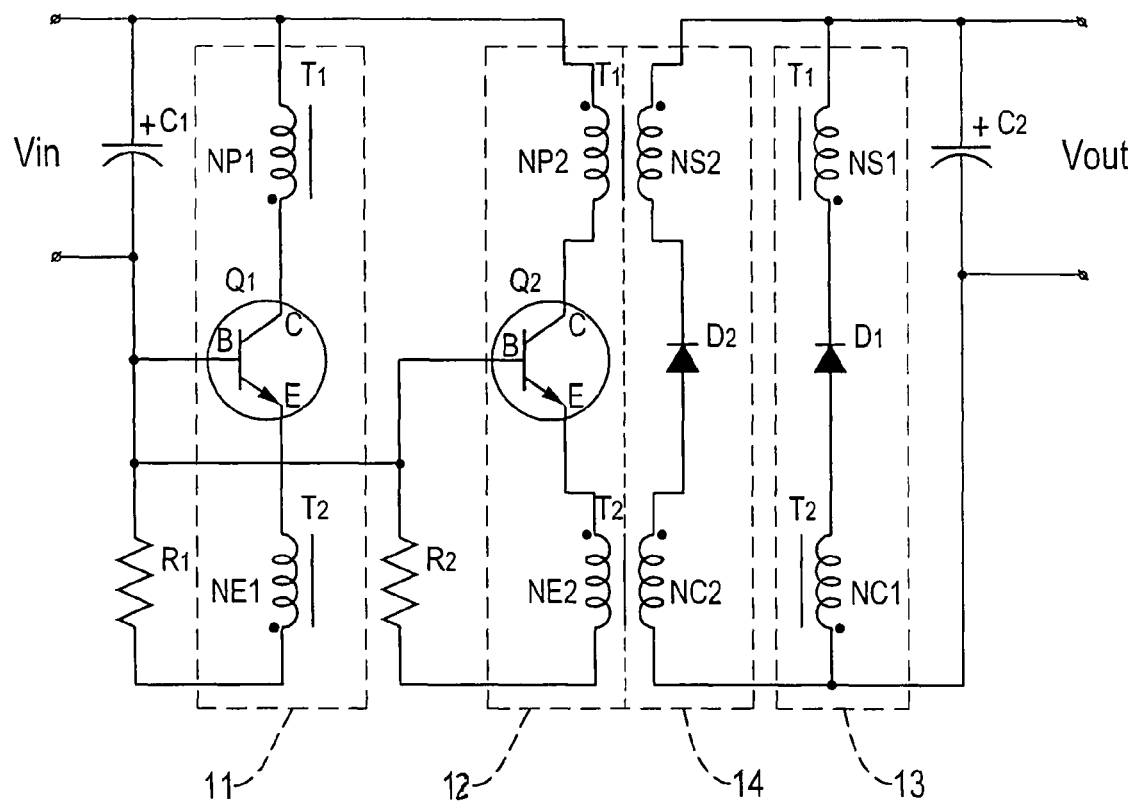
FIG. 1 is a circuit diagram of a self-oscillating power converter in accordance with the present invention.

With reference to FIG. 1, the self-oscillating converter of the present invention comprises of a main power transformer (T1), a current drive transformer (T2), two NPN power BJT transistors as switching transistors (Q1)(Q2), and two output diodes (D1)(D2) as rectifiers. Each transformer (T1)(T2) has two input windings (NP1, NP2)(NE1, NE2) and two secondary windings (NS1,NS2)(NC1,NC2). The input windings (NP1, NP2) of the main power transformer (T1) are respectively connected in series through the switching transistors (Q1)(Q2) to the primary windings (NE1, NE2) of the current drive transformer (T2) to form two primary branches (11)(12). The output windings (NS1, NS2) of the main power transformer (T1) are similarly connected in series through the output diodes (D1)(D2) to the secondary windings (NC1, NC2) of the current drive transformer (T2) to form two secondary branches (13)(14).

Figure 2A:
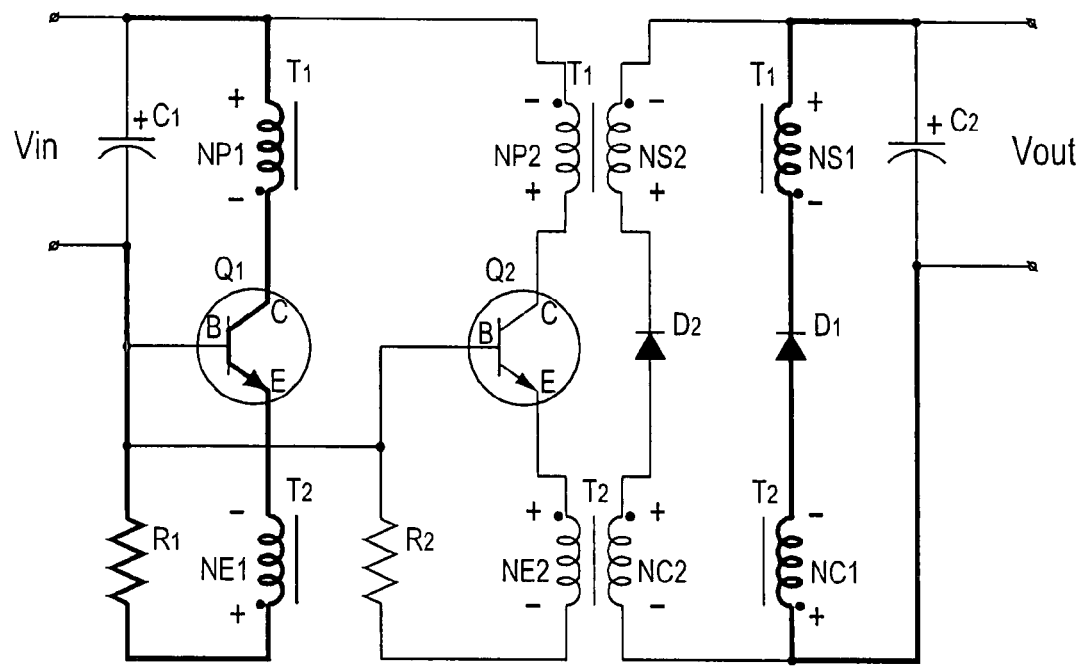
FIG. 2A shows a first switching transistor of the power converter being turned-on by a current-drive transformer.

Whenever one of the switching transistors (Q1)(Q2) is turned-on and a secondary current flows in the secondary winding (NS1,NS2)(NC1,NC2) to the output, the current drive transformer (T2) will transform that current back to a primary current to drive the transistor (Q1)(Q2). The base-emitter junction of each transistor (Q1)(Q2) forms a rectifier for the current drive transformer (T2) on the primary side. A resistor (R1)(R2) in series with the transistor (Q1)(Q2) and the current drive transformer (T2) will make sure that the drive transformer acts as a current drive transformer. Both secondary branches (13)(14) will have their own rectifier (D11)(D2) to supply the output. In this way the current to drive the switching transistor (Q1)(Q2) is created by its own collector current with an amplification factor of both transformers (T1)(T2) in series, but depending on the amplitude of the output current. Magnetization current from any of the two transformers (T1)(T2) will now steal or take away current from the round going amplification from collector back to emitter of the switching transistor (Q1)(Q2). For example, the first switching transistor (Q1) as shown in FIG. 2A of the first primary branch (11) is tuned-on and a current flows through the first secondary branch (13) to the output. The current drive transformer (T2) transforms that first secondary branch current back to a primary current to drive the first transistor (Q1).

Figure 2B:
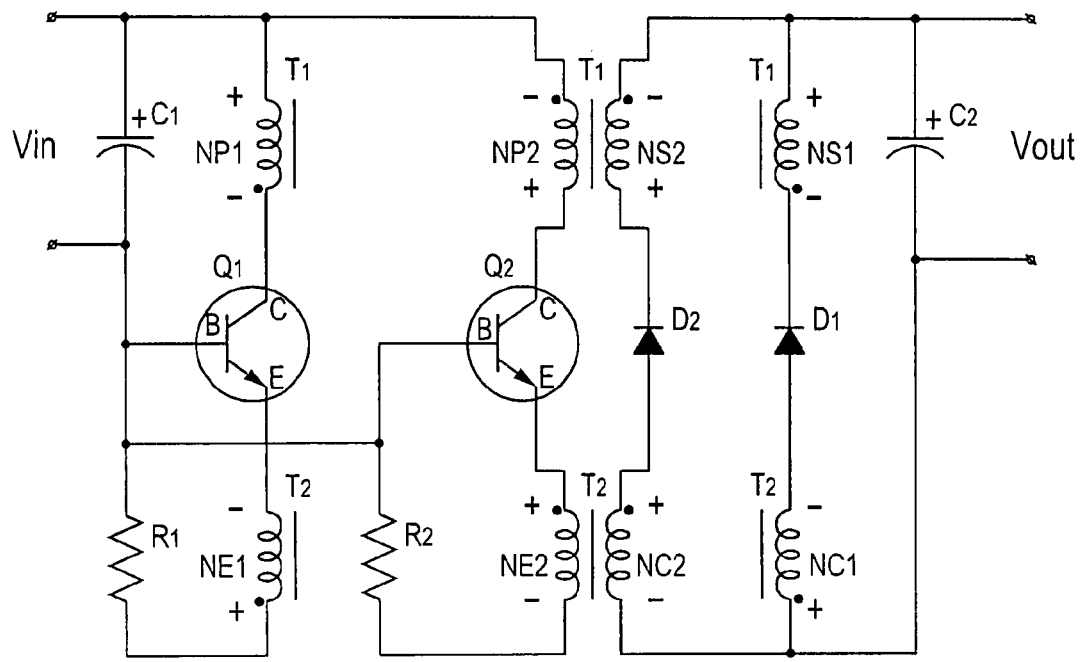
FIG. 2B shows the first switching transistor of the power converter being turned-off.

With reference to FIG. 2B, the stealing will eventually cause the first switching transistor (Q1) to be turned-off since there will not be enough current left to drive the transistor (Q1) sufficiently. The voltage over the transistor (Q1) will then increase, which results in a drop in secondary voltage of the current drive transformer (T2). Since the secondary side of the current drive transformer (T2) is almost direct connected to the output capacitor (C2), the secondary current will stop. Output diode (D1) will stop conducting since the transformer voltage will become lower than the said capacitor voltage. When there is no secondary current left, there will be no more current to drive transistor (Q1) through the current drive transformer (T2) and results in a turn-off of the transistor (Q1).

Figure 2C:
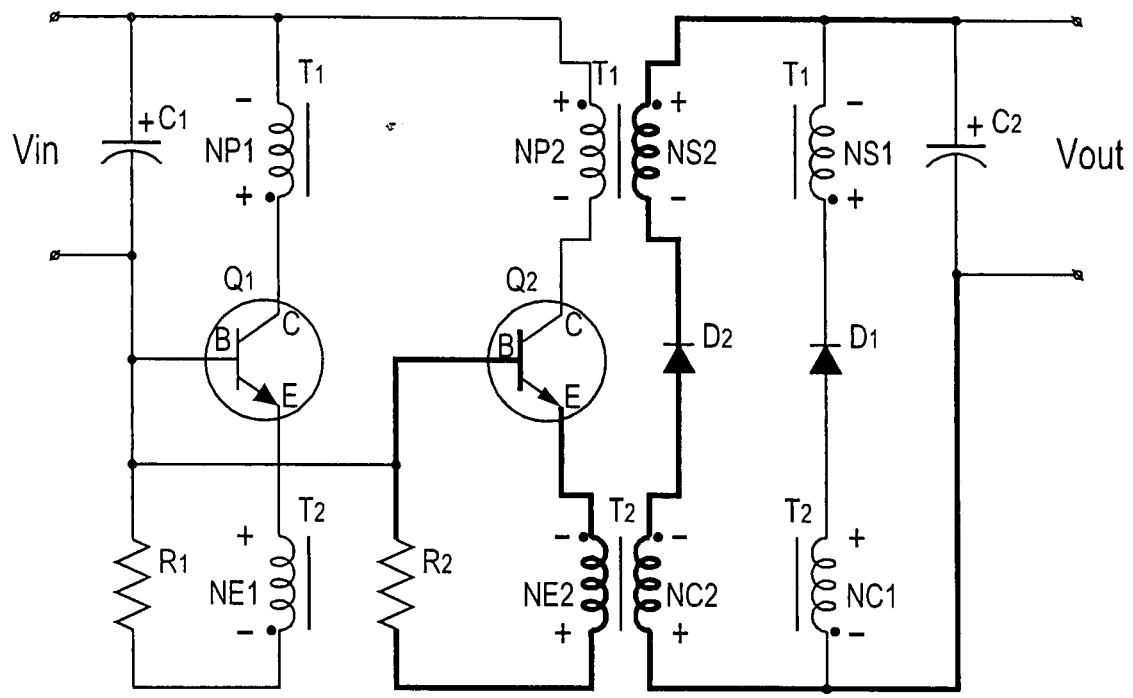
FIG. 2C shows the occurrence of a small emitter current of a second switching transistor of the power converter.

With reference to FIG. 2C, after the first switching transistor (Q1) is turned-off, the stored energy inside the main power transformer (T1) wants to go out and causes a reset action. The voltage of the main power transformer (T1) will automatically reverse in a rate that is depending on the stored energy and the parasitic capacitance of the circuit. The secondary side of the main power transformer (T1) will swing up similarly as the primary side, until the output diode (D2) starts conducting and a small current will flow through the second secondary branch (14) of the second switch (Q2). This small current will cause a small emitter current to flow through the current drive transformer (T2).

Figure 2D:
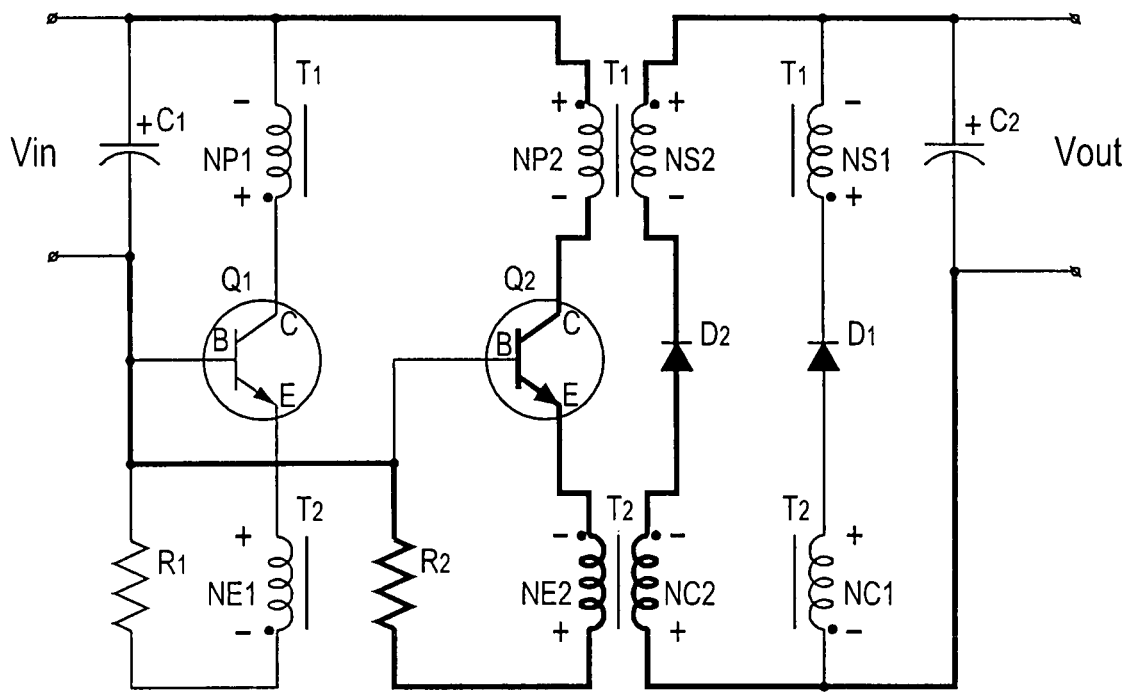
FIG. 2D shows a second switching transistor of the power converter being turned-on by the current-drive transformer.

With reference to FIG. 2D, the small emitter current will then eventually turn-on the second switching transistor (Q2) and the foregoing operations of FIGS. 2A-2D will repeat itself.

At a certain point, the output voltage (Vout) of the converter will have reached its set point (by turn-ratio of the main transformer), the junction capacitance of the output diode (D1)(D2) will now cause the output voltage (Vout) to raise even a little bit further. This will eventually result in a situation in which there will be no more current in the secondary branch (13)(14), even though the transistor (Q1)(Q2) might be completely turned-on. In this case there will be no secondary current hence no primary current to drive the transistor (Q1)(Q2) and the converter will stop oscillating. A restart is now required to let the converter start switching again.

Since the main power transformer (T1) will swing after the first transistor (Q1) is turned off and sequentially turn-on the next switching transistor (Q2), there is no need to control the dead-time to prevent from overlapping. In other words, the overlapping situation is just impossible to occur.

Figure 3:
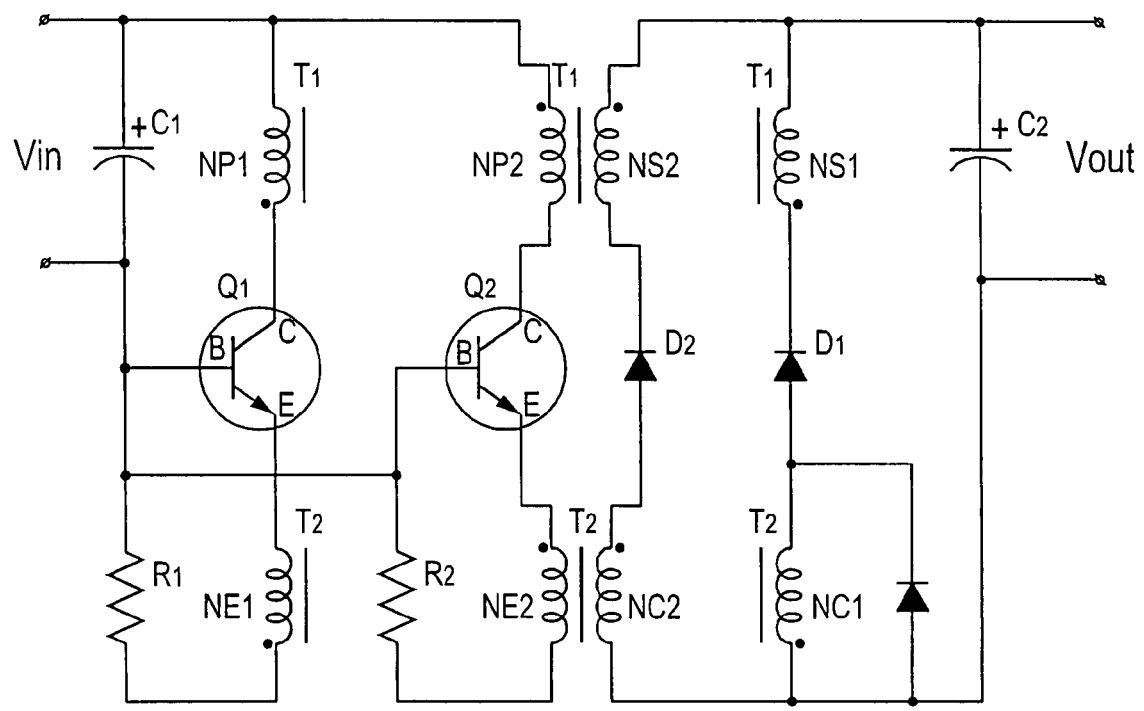
FIG. 3 is a circuit diagram of a self-oscillating power converter of another embodiment in accordance with the present invention

During start-up, sudden increments in the input voltage (Vin) or sudden decrements in the output voltage (Vout) may occur like short-circuit or major overload conditions. In order to prevent the transistors (Q1)(Q2) from switching excessive currents, the drive current must be limited. This can be achieved by putting a clamping device like a diode in parallel over the secondary windings (NC1)(NC2) of the current transformer (T2) as shown in FIG. 3, or any clamping device such as a zener-diode connected in parallel over the primary side of the current transformer (T2). This way, emitter current will be "stolen" and the transistor will be turned-off.

Transistors (Q1)(Q2) are most rugged when connected in a common-base arrangement. This way the maximum allowable collector voltage can in general be almost double the Vceo. This is also a requirement in this topology since the transistors (Q1)(Q2) are driving a transformer in a push-pull arrangement, which means that the collector voltage will be twice the input voltage (Vin).

For low output voltage/high output current requirements, the current transformer (T2) can also be used to drive MOSFETs that replace the output diodes (D1)(D2). In this case the MOSFETs will be switched on when the current through the primary transistors (Q1)(Q2) reaches a set value. This will improve efficiency and output voltage regulation. During low loads the body or an external diode will do the task while increasing currents will cause the MOSFETs to start taking over which causes an increment of the output voltage, resulting in an overall improvement of load regulation and average active mode efficiency.

Although the present invention is self-oscillating, it will not start on itself. Therefore, a start-up pulse generated by a restart pulse circuit is required either on the secondary side of the current transformer (T2) or on the emitter of any switching transistor (Q1)(Q2). To make the hiccup work without too much of output ripple, the restart pulse must have a frequency that is high enough to result in an output ripple voltage being still within the requirements. The restart pulse circuit must of course be disabled while the converter is switching normally to prevent unintentional turn-on of any switch.

Self-oscillation occurs due to energy storage in the main power transformer (T1) which results in a duty cycle approximated to 50%. This high duty cycle ensures an efficiency that is as high as possible and results in an almost continuous supply of current to the output which allows for small output capacitance. The output voltage (Vout) now becomes almost a reflection of the input voltage (Vin), resulting in the quality of the output voltage (Vout) being direct proportional to the quality of the applied input voltage (Vin). An alias for this design could therefore as well be "DC transformer".

Furthermore, when the topology of the present invention is applied to a diode bridge and bulk-capacitor in order to make it an AC/DC converter, it is imperative to choose the size and quality of the bulk-capacitor according to the required quality of the output voltage because of the "DC transformer" behavior.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A push-pull type power converter comprising:
   a main power transformer having a primary side and a secondary side;
   a current drive transformer having a primary side and a secondary side that is connected in series with the secondary side of the main power transformer in such a way that a secondary current flowing through the two secondary sides is feedback to the primary side of the current drive transformer in order to give a drive current to two primary switches, the drive current being proportional to the secondary current in the secondary side of the main power transformer,
   wherein each of the primary sides comprising two primary windings, and the primary windings of the main power transformer being respectively connected through the primary switches to the primary windings of the current drive transformer in series to form two primary branches.

2. The push-pull type power converter as claimed in claim 1, each of the secondary sides comprising two secondary windings, and the secondary windings of the main power transformer being respectively connected through two output diodes to the secondary windings of the current drive transformer in series to form two secondary branches.

3. The push-pull type power converter as claimed in claim 2, wherein the primary switches are NPN power BJT transistors.

4. The push-pull type power converter as claimed in claim 3, wherein a clamping device is connected in parallel to the secondary windings of the current transformer.

5. The push-pull type power converter as claimed in claim 4, wherein the clamping device is a diode.

6. The push-pull type power converter as claimed in claim 3, wherein a clamping device is connected in parallel over the primary side of the current transformer.

7. The push-pull type power converter as claimed in claim 6, wherein the clamping device is a zener diode.

8. The push-pull type power converter as claimed in claim 3, wherein a resistor is connected between an emitter of each primary switch and a respective primary winding of the current drive transformer.

* * * * *